Figure 1:
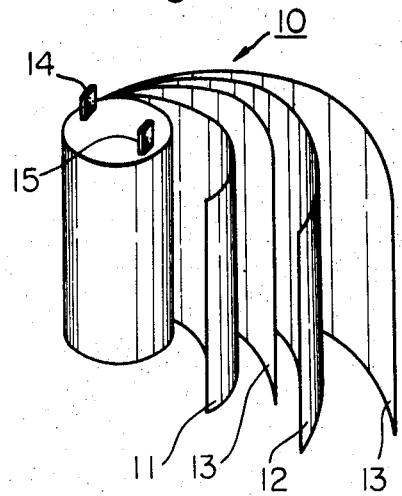

United States Patent

[11] 3,607,751

[72] Inventor: Susumu Yoshimura, Kadoma, Japan
[21] Appl. No.: 835,927
[22] Filed: June 24, 1969
[45] Patented: Sept. 21, 1971
[73] Assignee: Matsushita Electric Industrial Company, Limited, Osaka, Japan
[32] Priority: July 2, 1968, Sept. 19, 1968, Sept. 19, 1968
[33] Japan
[31] 43-46684, 43-68993 and 43-68994

[54] ELECTROLYTIC CAPACITOR
1 Claim, 2 Drawing Figs.
[52] U.S. Cl. ............... 252/62.2, 317/230
[51] Int. Cl. ............... H01g 9/02
[50] Field of Search ............... 317/230, 231, 233; 252/62.2

[56] References Cited
UNITED STATES PATENTS

| | | | |
|---|---|---|---|
| 2,866,139 | 12/1958 | Ross | 317/230 |
| 2,965,816 | 12/1960 | Ross | 317/230 |
| 3,138,746 | 6/1964 | Burger | 317/230 |
| 3,293,506 | 12/1966 | Chesnot | 317/230 |
| 3,331,002 | 7/1967 | Everitt | 317/230 |
| 3,504,237 | 3/1970 | Stahr | 317/230 |

FOREIGN PATENTS

| 405,151 | 2/1934 | Great Britain | 317/230 |
|---|---|---|---|

Primary Examiner—James D. Kallam
Attorney—John Lezdey

ABSTRACT: An electrolytic capacitor having a metal electrode with a dielectric film thereon and an electrolyte which is composed of an organic acid, substances such as p-quinone and manganese dioxide as an ionization substance and highly dielectric solvents such as dimethyl formamide and polyhydric alcohol.

A good conductivity and a large film recovery capability are achieved with this composition electrolyte.

PATENTED SEP 21 1971

3,607,751

INVENTOR
SUSUMU YOSHIMURA
BY
ATTORNEY

ELECTROLYTIC CAPACITOR

This invention relates to an electrolytic capacitor which has an improved performance for a wide range of temperature, and more particularly to improvements of the electrolyte composition, according to which a controlled and stable electrical resistance and a high film-reforming capability of the electrolyte are realized by means of oxidizing agents added to the conventional nonaqueous, organic electrolytes.

Main advantages of electrolytic capacitors are a large capacitance-to-volume ratio and a low cost per microfarad of capacitance. These use aluminum or tantalum anodes on which a thin dielectric film is formed anodically. The presence of an electrolyte is essential for the application of anodic oxide to a capacitor device. There are two types of electrolytic capacitors specified by the electrolyte adopted, (1) a dry- or wet-electrolytic capacitor, and (2) a solid-electrolyte capacitor.

The electrolyte of the best quality used in the conventional dry electrolytic capacitor comprises a mixture of solvents, dimethyl formamide and ethylene glycol, and an ionogen, such as ammonium picrate, dissolved in it. The electrolyte of such type has an electric resistance of approximate $10^2$ ohm-cm. and also has an advantage that it does neither deteriorate nor produce a gas at an elevated temperature over 100° C., while it has disadvantages that it has a coloration and also has a property that its resistance gradually increases due to the reduction of the picrate ion. Another essential disadvantage of such organic electrolyte is the inappropriateness for use at high working voltages, because of its low sparking voltage of about 30–40 volts.

The electrolyte of the electrolytic capacitor has preferably the properties of (1) a recovery capability against a partial breakdown of a film, (2) as high conductivity as possible to prevent large dielectric loss of the capacitor, and (3) as low water content as possible in order to prevent the deterioration of the anodic film of the capacitor.

This invention has, therefore, an object of providing an improved electrolyte for an electrolytic capacitor which has a conductivity of the same or higher order as compared to the conventional one and extremely high film-reforming capability by adding a predetermined amount of p-quinone or manganese dioxide to the electrolyte soluted with an organic acid into a mixture made with high dielectric solvents of dimethyl formamide and the polyhydric alcohol group, such as ethylene glycol.

Figure 2:
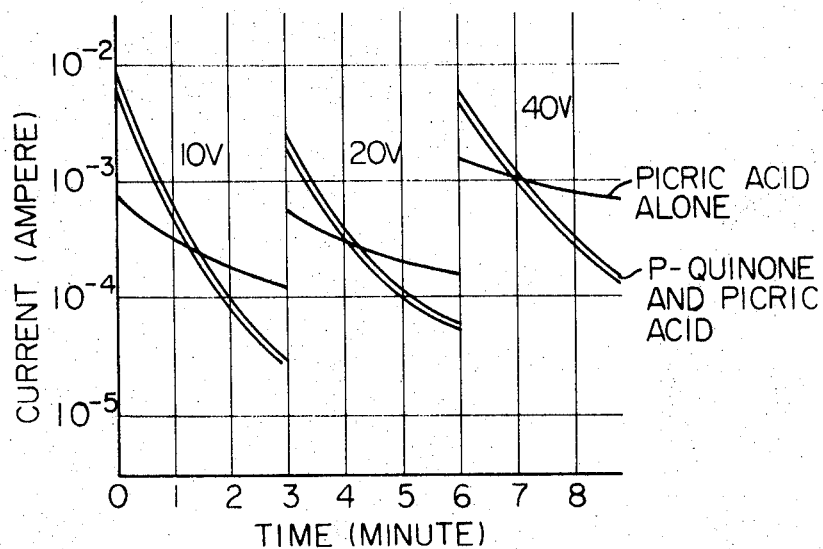

The features and advantages of the present invention will become apparent from the following description used in conjunction with the accompanying drawing, in which:

FIG. 1 is a perspective view of an electrolytic capacitor of roll type used with an electrolyte in accordance with the present invention; and FIG. 2 is a graphical representation of the relationship between the current and the time of a formation curve of the electrolyte used in the capacitor according to the present invention.

The electrolytic capacitor 10 shown in FIG. 1 comprises a positive foil 11 made of a film-forming metal such as tantalum, aluminum, etc., which has an oxide film formed thereon after being etched with a procedure known per se, a negative foil 12 made of a metal, a spacer 13 disposed between the positive and negative foils 11 and 12 and immersed with a composition of an electrolyte, a positive external lead 14 connected with the positive foil 11, and a negative external lead 15 connected with the negative foil 12.

The assembly of such a capacitor is immersed in the composition of the electrolyte, thereafter this is put into a sealing container (not shown) and then external terminals are so provided as to connect the positive and negative foils 11 and 12 therewith, respectively.

According to the present invention, the spacer 13 is immersed with a particular solution of a predetermined organic acid with p-quinone or manganese dioxide as an ionization substance and a mixture of high dielectric solvents of dimethyl formamide and the polyhydric alcohol group, such as ethylene glycol. This electrolyte composition provides high conductivity and film-forming capability due to the interactions of molecules contained in the substances.

The solution of dimethyl formamide soluted with p-quinone alone has a specific resistance of 100,000 ohm-cm. or larger and does not exhibit a film-forming property against the valve metals. On the other hand, several types of organic acids, such as picric acid, salicylic acid, acethylsalicylic acid, benzoic acid, etc., have some extent of film-forming capacity against the aforementioned metals and relatively low electrical resistance. They, however, are not suitable for the electrolytes of an electrolytic capacitor due to their incomplete characteristics in both resistance and film-forming capacity.

When p-quinone or manganese dioxide is soluted in the solution containing one of the organic acid described above and a suitable solvent, there realizes a high conductivity and film-forming capability, which enables those organic solutions all suitable for use in electrolytic capacitor devices. An aluminum foil is anodized at constant current in an organic electrolyte, and the electrolytic efficiency and the sparking voltage are measured. Electrolytes without p-quinone show a low electrolytic efficiency and low sparking voltage of at most 50 volts, while those containing p-quinone or manganese dioxide give an enhanced efficiency and sparking voltage.

The mechanism of these phenomena is not yet known, but some comments are due on the basis of present informations. p-quinone are known to have a strong oxidizability against the other organic compounds. The effect of the p-quinone upon the picrate-based electrolyte can be explained on the basis of the strong oxidizability of the former, and more particularly of the fact that the activity of the solution is maintained with the aid of p-quinone even if the picrate ions are converted into a reduced form during the lifetime of the electrolytic capacitor. In short, p-quinone oxidizes the reduced form of organic ionogen back to the active acid form and then the resistivity and the film-forming capability is not changed for a wide range of temperature and in the long period of working condition.

The aforementioned manganese dioxide or $Mn^{4+}$ ion has strong oxidizability against the organic substances known per se. If the manganese ion exists in the solution of the organic substance, the latter may sometimes be converted into a plastic state as a result of excess oxidation. On the other hand, if aluminum, tantalum, etc., are oxidized by the organic electrolyte, the oxidizing action is sometimes stopped on its way. This phenomenon occurs since the electrolyte has a weak oxidizability, the reduction of the organic ionization substance and the production of hydrogen has occurred before the metal is oxidized. If a small amount of manganese dioxide such as, for example, less than 10 percent is present in the solution, (1) the formation speed increases sharply and (2) the spark voltage increases to 100 volts because, since manganese dioxide or $Mn^{4+}$ ion exists, the host organic ion is always present as an oxidizing agent.

Salicylic acid and benzenesulfonic acid are particularly preferable for the electrolyte together with manganese dioxide because they do not cause coloration of the electrolyte like picric acid in the conventional electrolyte. Further, manganese dioxide acts as a water absorbing agent with the result that it completely absorbs the water contained in the electrolyte.

The solvent of the electrolyte may be dimethyl formamide in such a case, but it is preferably mixed with a polyhydric alcohol such as ethylene glycol so as to improve its quality at a low temperature and is also preferably mixed with phosphorus pentoxide in order to remove the water content contained in the electrolyte known per se.

The aforementioned ammonium picrate has a good conductivity and a considerable film-forming property against aluminum. For example, the solution of 250 grammes ammonium picrate dissolved in 1,000 grammes dimethyl formamide has an electric conductivity of $1.4 \times 10^{12} \Omega^{11} cm.$ [11].

This invention will further become apparent from the following Examples:

EXAMPLE I

This example uses picric acid.

An electrolyte containing 20 percent by weight p-quinone and 60 percent by weight dimethyl formamide has a specific resistance of 100,000 ohm-cm. An addition of 1 percent by weight picric acid to the solution reduces the specific resistance to 100 –1,000 ohm-cm. The addition results in large increases in oxidizability of aluminum and tantalum by the electrolyte. Thus the addition of 1 percent by weight picric acid to the electrolyte causes a 10–100-fold decrease in the specific resistance and correspondingly a 10–100-fold increase in oxidizing power. This is particularly effective for reformation of the oxide film with the result that a leakage current is lessened by approximately two orders with respect to the electrolyte with the picric acid alone.

FIG. 2 shows an example of a comparison of formation curves of electrolytes one having 10 percent picric acid and 90 percent dimethyl formamide and the other having 10 percent p-quinone, 5 percent picric acid and 85 percent dimethyl formamide.

It is understood from the graph shown in FIG. 2 that the current with the electrolyte containing p-quinone and picric acid decreases sharply due to the formation of oxide film.

It is also understood that although p-quinone is a strong oxidant, known per se, the oxidizing action of p-quinone alone is not sufficient to oxidize aluminum and tantalum. However, if picric acid has been added at any one time to p-quinone, the solution becomes an extremely powerful oxidant. This is considered to be a result of the formation of an oxidation-reduction reaction system in which the relatively small amount of picric acid carries out a continuous oxidation of the metal by being itself reoxidized by p-quinone after reduction.

The leak current of the electrolytic capacitor having a thus improved electrolyte decreases to less than $10^{17}$ amperes. Since only one-tenth of the amount of picric acid used in the conventional electrolyte is required, the coloration problem is also solved.

EXAMPLE II

In this example a solution of 250 grammes ammonium picrate in 1,000 grammes dimethyl formamide is used.

When aluminum was oxidized using this solution at a constant current formation, the voltage increased at a velocity of 5 volts per minute relative to a current of 10 milliamperes per square centimeter. An addition of 50–100 grammes p-quinone to the solution increased its oxidizing power sharply. The velocity of the voltage increase multiplied 5–10-fold at the same current density as aforementioned.

The electrolyte thus obtained has superior operational characteristics particularly at a high temperature, as compared to the prior electrolyte. It does not produce any gas, nor deteriorate, and in addition it maintains a constant capacitance with respect to time.

In order to actually construct the electrolytic capacitor so as to improve its property at a high temperature known per se, polyhydric alcohol such as ethylene glycol is preferably mixed therewith, and a phosphorus oxide preferably mixed therewith in order to remove its water content.

EXAMPLE III

This example uses an electrolyte having an organic substance, other than ammonium picrate with high electric conductivity but low oxidizing ability such as, for example ammonium salicylate and ammonium benzenesulfonate.

Ammonium salicylate and ammonium benzenesulfonate have an electric resistivity of approximately $10^3$ ohm-cm. It was impossible to increase the voltage over 15 volts at a rate of 10 milliamperes per square centimeter.

When 50–100 grammes p-quinone (approximate 10 percent) was applied to this solution similarly to the Example II, the conductivity of the solution increased up to 20-30 percent at the maximum while the oxidizing ability thereof increased sharply in such a manner that its formation speed grew 5 volts per minute and accordingly its maximum voltage or spark voltage increased up to 90 volts.

EXAMPLE IV

This example uses an electrolyte having (1) picric acid or ammonium picrate, (2) salicylic acid or ammonium salicylate, (3) benzenesulfonic acid or ammonium benzenesulfonate as an organic ionogen dissolved in ethylene glycol and dimethyl formamide with 5-10 percent manganese dioxide added.

In case of using (1) particularly using picric acid alone, the increased voltage stopped at 20 volts, but when manganese dioxide was added thereto the formation speed of 10 volts per minute and spark voltage of 120 volts were obtained.

In case of using ammonium picrate, the formation speed of the solution increased 5-fold.

Although the content of water plays an important role in the above-mentioned examples, the feature of this invention is that the normal organic solution can be activated by means of p-quinone and $MnO_2$ dissolved in it, making the water contact as small as possible.

I claim:

1. A nonaqueous electrolyte for an electrolytic capacitor consisting of a mixture of polyhydric alcohols and amides, an oxidizing agent selected from the group consisting of p-quinone and manganese dioxide, and an ionogen selected from the group consisting of picric acid, salicylic acid, acetylsalicylic acid, benzoic acid and the salts thereof.